Dec. 25, 1951 H. G. ALLEN ET AL 2,579,458
MACHINE FOR APPLYING BANDING SLEEVES TO CONTAINERS
Filed Sept. 21, 1944 8 Sheets-Sheet 1
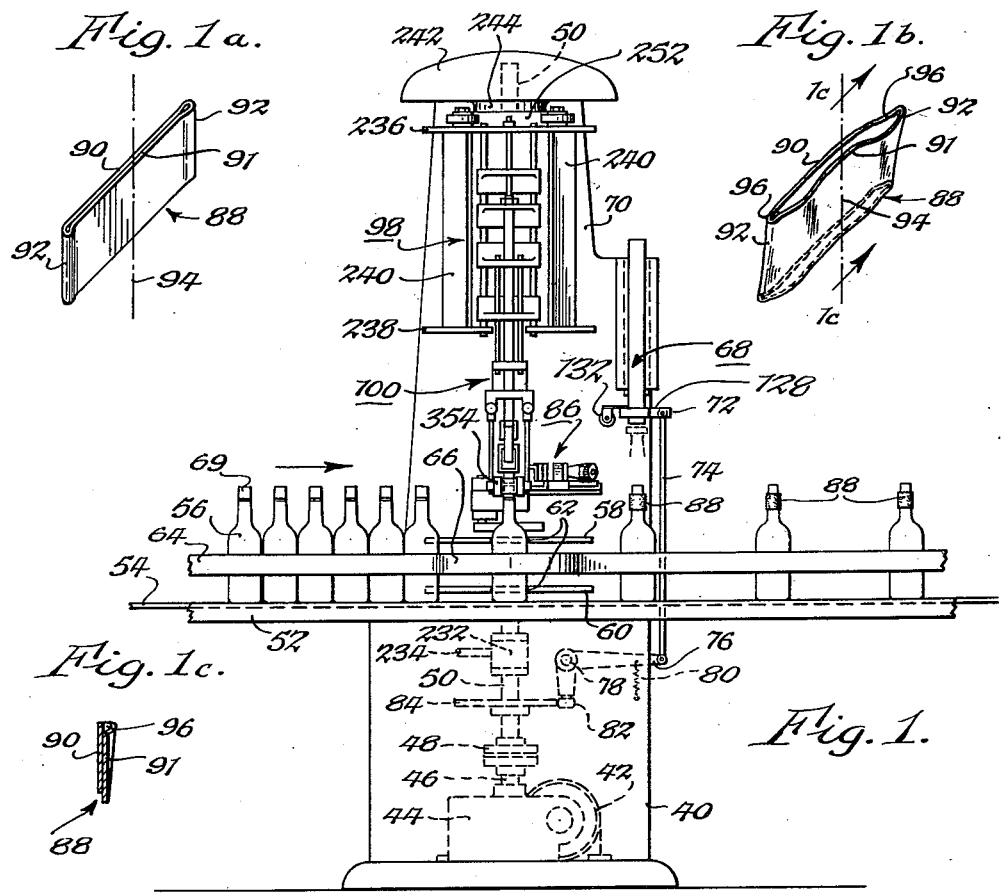
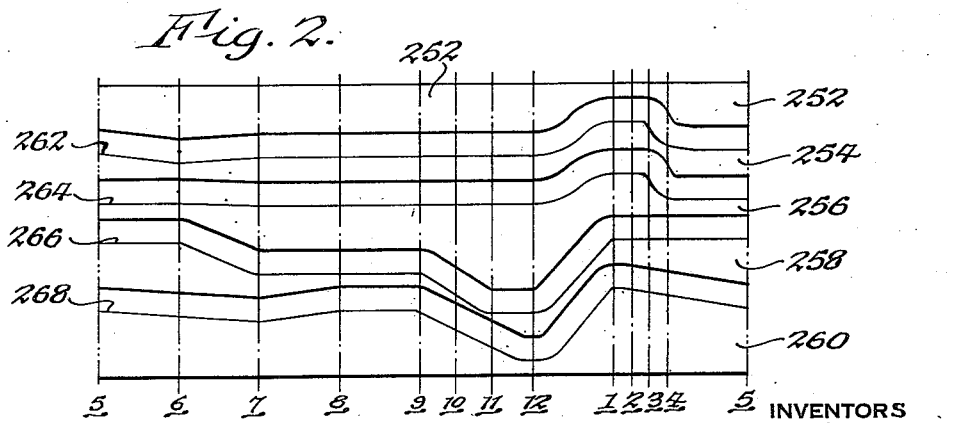
INVENTORS
Howard G. Allen
William O. Sims
Edward A. Ebert
By James D. Bock
ATTORNEY Dec. 25, 1951     H. G. ALLEN ET AL     2,579,458
MACHINE FOR APPLYING BANDING SLEEVES TO CONTAINERS
Filed Sept. 21, 1944     8 Sheets-Sheet 2

INVENTORS
Howard G. Allen
William O. Sims
Edward A. Ebert
By James D. Bock
ATTORNEY Dec. 25, 1951     H. G. ALLEN ET AL     2,579,458
MACHINE FOR APPLYING BANDING SLEEVES TO CONTAINERS
Filed Sept. 21, 1944     8 Sheets-Sheet 3

INVENTORS
Howard G. Allen
William O. Sims
Edward A. Ebert
By James D. Bock
ATTORNEY Dec. 25, 1951　　H. G. ALLEN ET AL　　2,579,458
MACHINE FOR APPLYING BANDING SLEEVES TO CONTAINERS
Filed Sept. 21, 1944　　8 Sheets-Sheet 4

INVENTORS
Howard G. Allen
William O. Sims
Edward A. Ebert
By James D. Bock
ATTORNEY

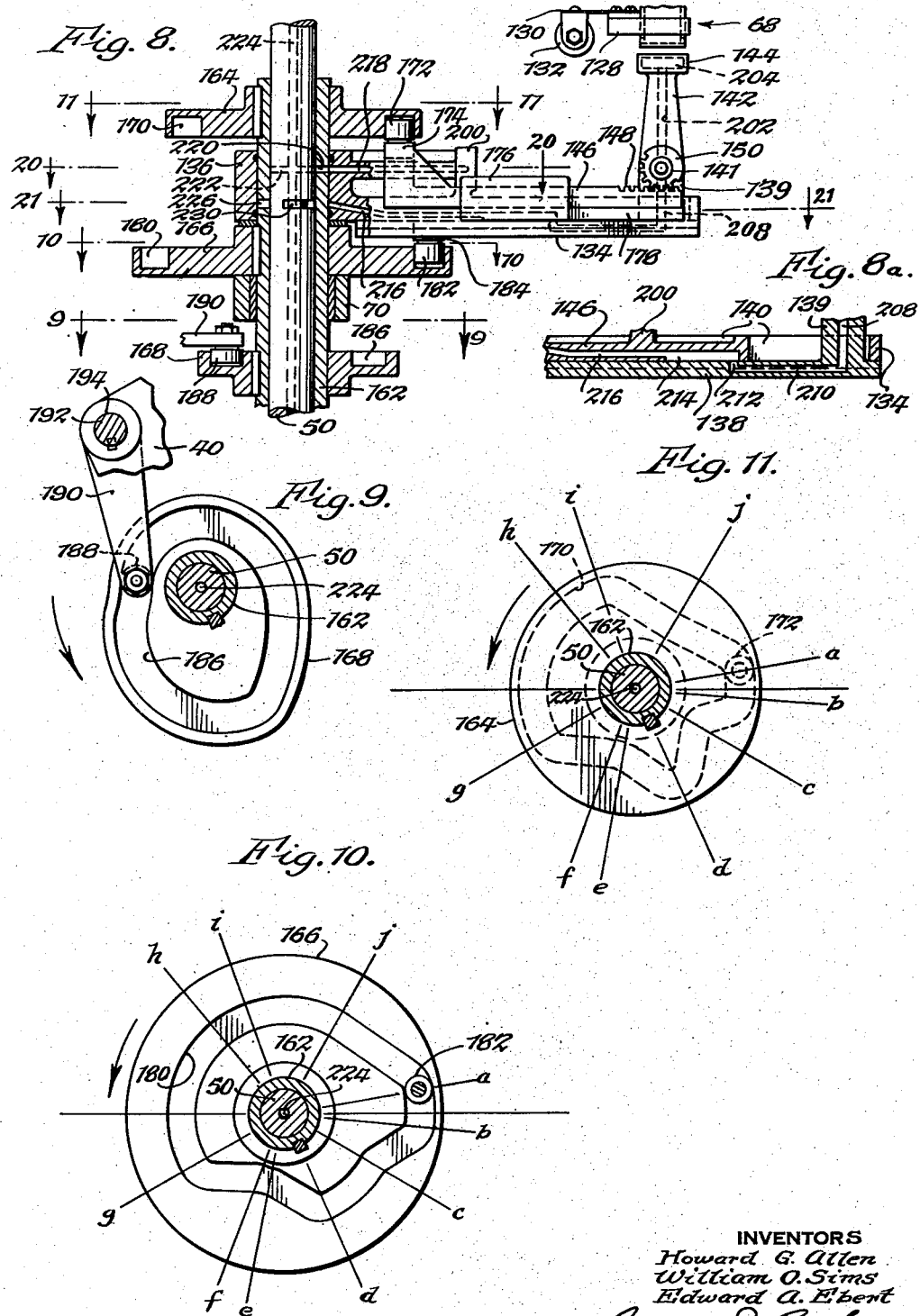

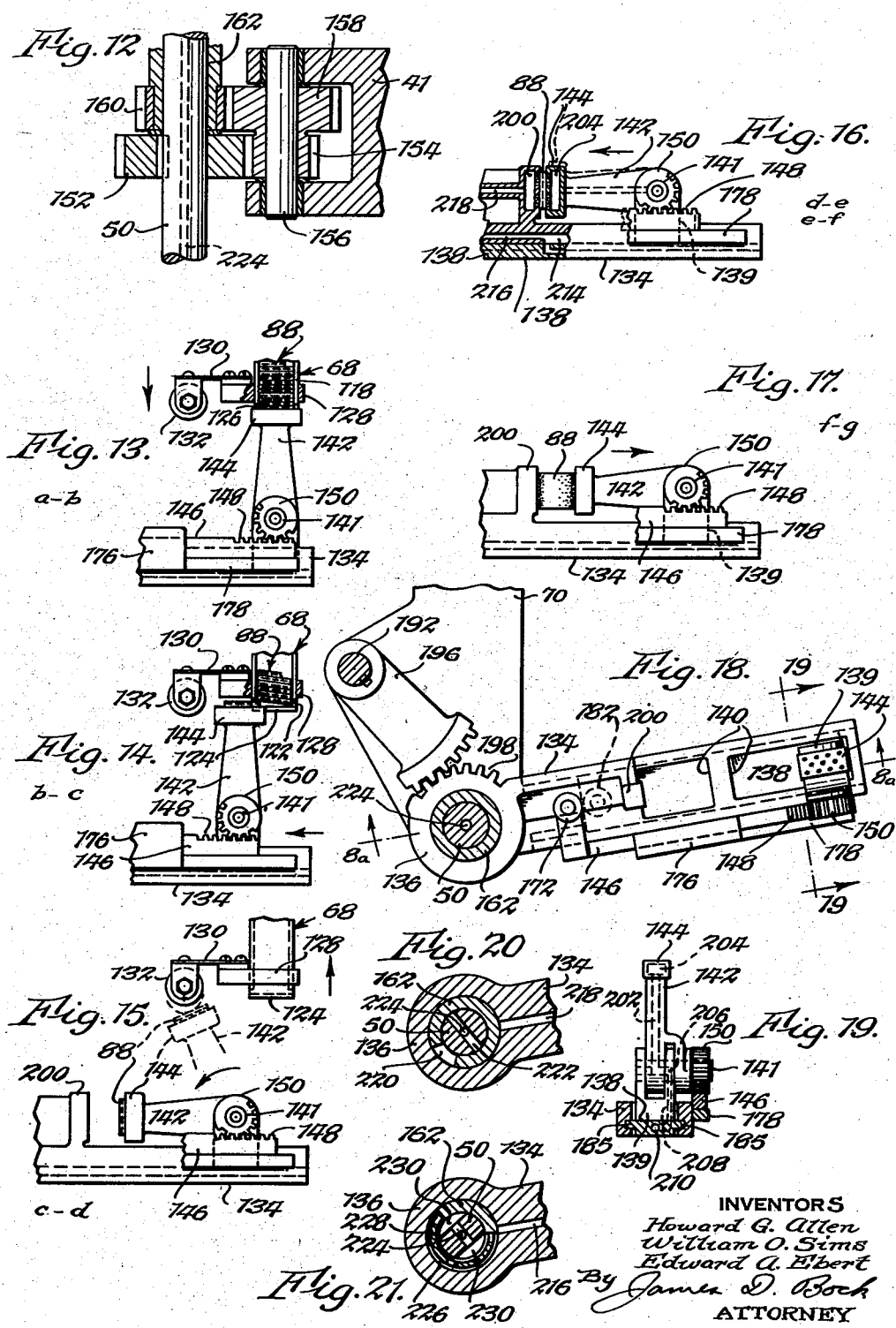

Dec. 25, 1951   H. G. ALLEN ET AL   2,579,458
MACHINE FOR APPLYING BANDING SLEEVES TO CONTAINERS
Filed Sept. 21, 1944   8 Sheets-Sheet 7
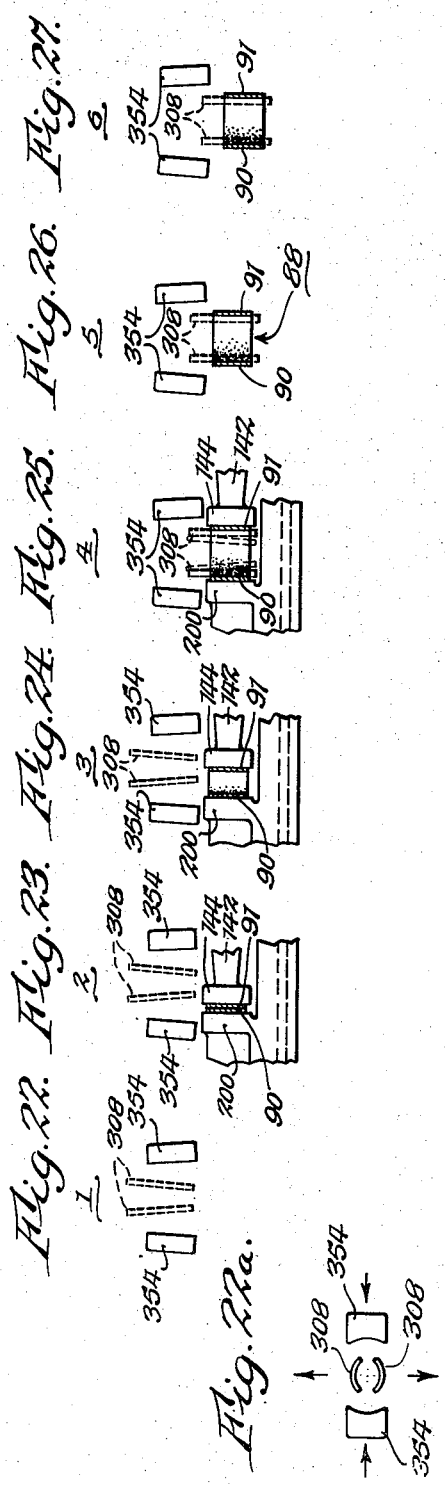
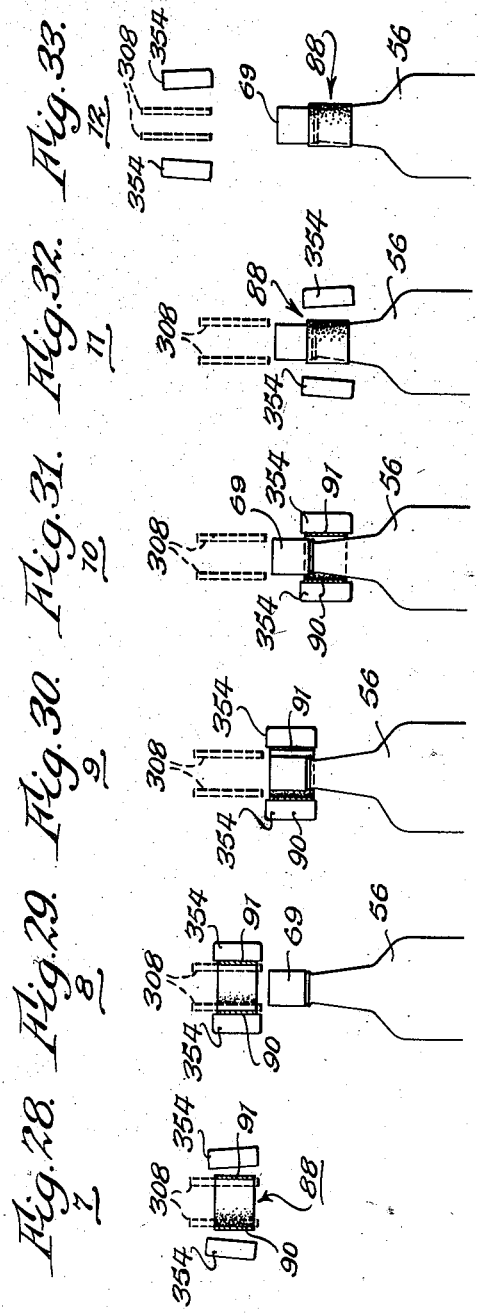
INVENTORS
Howard G. Allen
William O. Sims
Edward A. Ebert
By James D. Bock
ATTORNEY

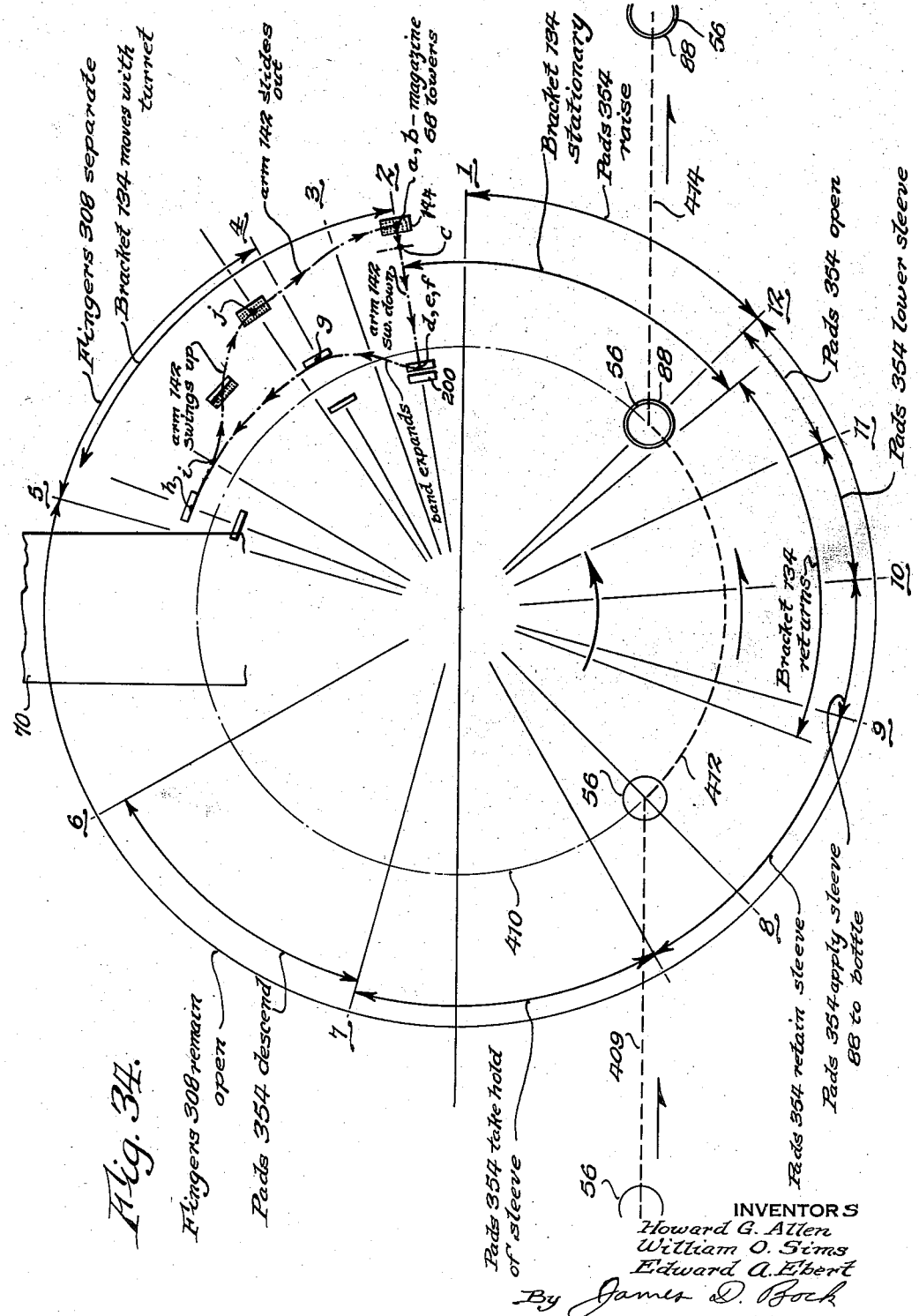

Patented Dec. 25, 1951

2,579,458

UNITED STATES PATENT OFFICE 2,579,458

MACHINE FOR APPLYING BANDING SLEEVES TO CONTAINERS

Howard G. Allen and William O. Sims, Niagara Falls, and Edward A. Ebert, Snyder, N. Y., assignors, by mesne assignments, to American Machine and Foundry Company, New York, N. Y., a corporation of New Jersey Application September 21, 1944, Serial No. 555,188

8 Claims. (Cl. 226—80)

1

The present invention relates to a machine for automatically applying banding sleeves to containers. One form of banding sleeve for which the machine of the present invention is particularly adapted is made of cellulosic material and is applied over the neck of a bottle in a wet and expanded condition from which it dries and shrinks into tight engagement with the bottle. The machine is also well adapted to operate with other forms of banding sleeves made from cellulose derivatives or from plastic materials in general which may be shrunk by drying or heating, for example, or which may be stretched and after application to the container may be rendered incapable of further stretching without permanent deformation.

Such banding sleeves are frequently supplied to a bottling plant in the form of rings of suitable width and diameter for the particular bottle to which they are to be applied. They are ordinarily furnished in flattened form in which the inner surfaces of the opposing wall portions of each sleeve are collapsed into face to face contact. When the sleeves are of the wet type they are packed in sealed containers containing a number of flattened sleeves immersed in a liquid.

Obviously the flattened sleeves must be opened into a substantially cylindrical form before they may be used. In many types of sleeves there is a very strong adherence between the inner surfaces of the opposing walls. This is particularly true of sleeves of the wet type. Accordingly, the automatic handling thereof by machinery is exceedingly difficult, and in most instances such sleeves have been applied by hand.

It is an object of the present invention to provide a machine which will automatically transfer sleeves of the general type discussed above successively from a suitable source of supply to the necks of containers and in the course of such transfer will rapidly and positively separate the opposing walls of the sleeves.

It is a further object of the present invention to provide a machine of the type described in the preceding paragraph in which special provision is made for the separation of the inner surfaces of opposing walls of the banding sleeves.

It is a further specific object of the present invention to provide a machine of the type described having a rotary turret in which one or more units for applying banding sleeves move in synchronism with containers to which the sleeves are to be applied, and a single mechanism for removing sleeves individually from a supply, opening them and positioning them successively

2 for transfer to the sleeve-applying unit or units of the turret.

It is a further specific object of the present invention to provide an improved mechanism for handling and applying to containers banding sleeves of the wet type.

Other and further objects of the present invention in part will be obvious and in part will become more apparent upon a consideration of the following description of a preferred embodiment of the invention taken in connection with the drawings accompanying and forming a part of the specification. In the drawings, Fig. 1 is a front elevation of a machine embodying the present invention;

Fig. 1a is a detailed view of a banding sleeve of the type for which the present invention is adapted;

Fig. 1b illustrates one manner of manipulating the banding sleeve shown in Fig. 1a to facilitate opening thereof;

Fig. 1c is a section along the line 1c—1c of Fig. 1b;

Fig. 2 is a development diagram of a barrel cam for controlling the sleeve-applying mechanism;

Fig. 8 is a fragmentary view partially in vertical section and partially in elevation illustrating the sleeve opening and transferring mechanism;

Fig. 8a is a fragmentary vertical sectional view of parts shown in Fig. 8, the section being taken along line 8a—8a in Fig. 18;

Fig. 9 is a horizontal sectional view taken along line 9—9 of Fig. 8;

Fig. 10 is a horizontal sectional view taken along the line 10—10 of Fig. 8;

Fig. 11 is a horizontal sectional view taken along the line 11—11 of Fig. 8, which also includes a timing diagram in which the positions of the opening and transferring mechanism are indicated by the characters a through j;

Fig. 12 is a fragmentary vertical sectional view of a gear and pinion assembly for driving certain of the parts illustrated in Fig. 8;

Figs. 13 through 17 are fragmentary elevations showing progressively the operation of the sleeve opening and transferring mechanism, the parts being shown in positions a through g;

Fig. 18 is a plan view of the sleeve opening and transferring mechanism;

Fig. 19 is a transverse vertical sectional view taken along the line 19—19 of Fig. 18;

Fig. 20 is a fragmentary horizontal sectional view taken along the line 20—20 of Fig. 8;

Fig. 21 is a fragmentary horizontal sectional view taken along the line 21—21 of Fig. 8;

Figure 3:
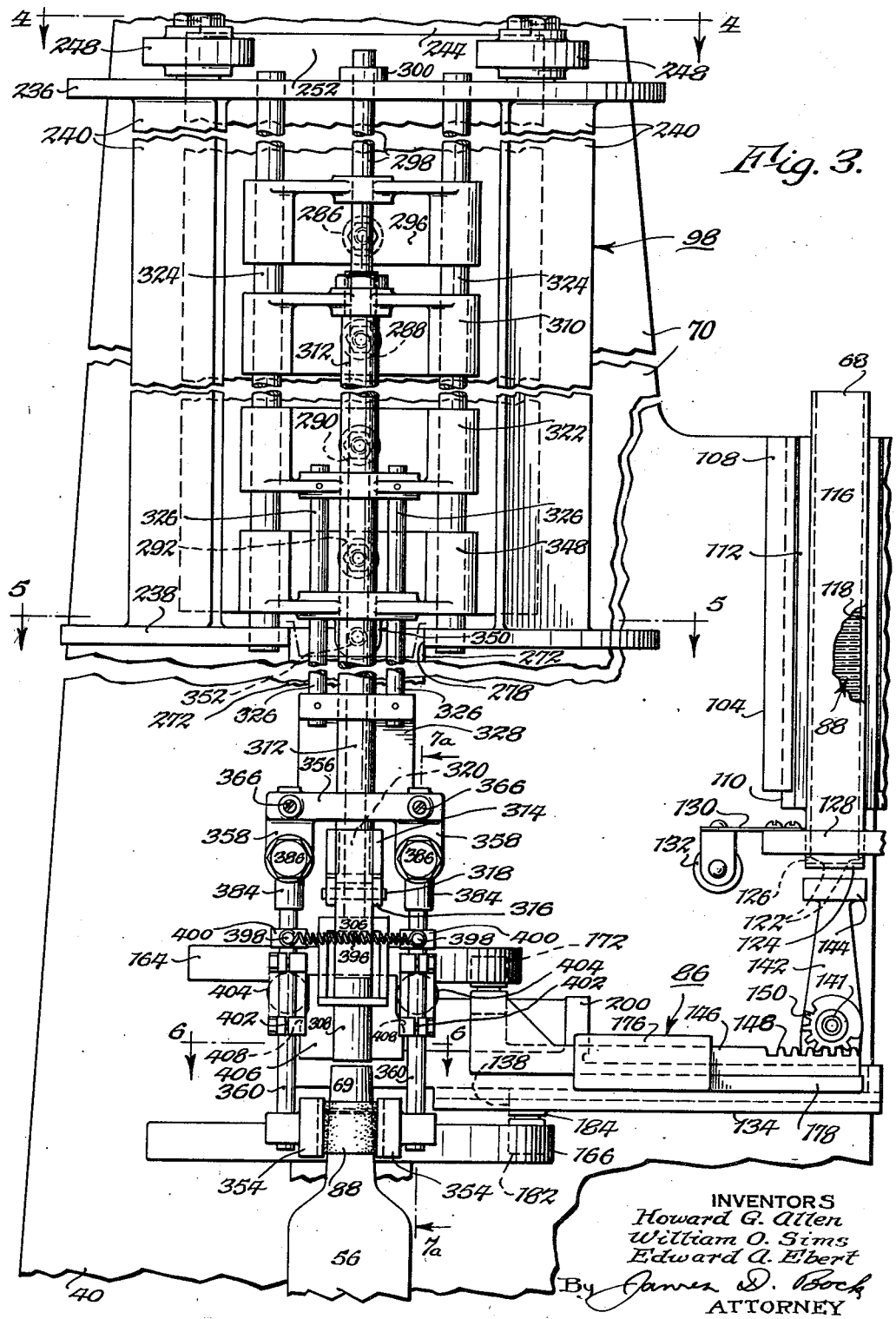
Fig. 3 is an enlarged fragmentary front elevation of a sleeve-applying unit and other parts of the machine shown in Fig. 1.

Figs. 22 through 33 are diagrammatic views illustrating progressively the operation of a sleeve-applying unit, the positions of the parts being identified by the numerals 1 through 12; and Fig. 34 is a diagram illustrating the complete sequence of operations during one revolution of the turret and one cycle of operation of the opening and transferring mechanism. In this diagram the turret positions are indicated by the numerals 1 through 12, corresponding to those used in Figs. 22 through 33, and the positions of the transferring and opening mechanism are indicated by the characters a through j, corresponding with the positions thus indicated in Fig. 11.

*General description*

The machine comprises a base 40 within which may be positioned a motor 42 and speed reducer or gear box 44 from which extends a vertical shaft 46 connected through a suitable flexible coupling 48 with a main vertical drive shaft 50 which extends to the top of the machine as shown in Fig. 1. A conveyer 52 is associated with the machine and the intake end of this conveyer lies to the left of the machine as viewed in Fig. 1. The conveyer 52 includes a movable belt 54 or other suitable device which serves to urge a line of containers 56 in the direction indicated by the arrow in Fig. 1.

Desirably the containers 56 are brought to the machine upon the intake end of the conveyer 52 in a solid line, as illustrated in Fig. 1. As successive containers 56 are brought toward the operative portion of the machine they come into contact with a suitable star wheel mechanism which in the illustrated embodiment comprises an upper disc 58 and a lower disc 60 fixed to the main shaft 50 for rotation therewith. Each of the discs 58 and 60 is provided with an appropriate number of notches 62 shaped to receive the particular form of container 56 for which the machine is adapted. The present machine includes two diametrically opposed operating units upon a rotary turret, and accordingly, notches 62 are formed in the discs 58 and 60 in diametrically opposite positions. Obviously, this is a matter of choice, dictated entirely by the number of operating units which it may be desired to include in the rotary turret.

A guide rail 64 is provided in proper association with the conveyer 52 for the purpose of maintaining the containers 56 in proper position thereon. In the operative zone of the machine the guide rail 64 has formed therein an arcuately bulged portion 66 which conforms with the circular contour of the discs 58 and 60. The bulged portion 66 is, of course, spaced from the discs 58 and 60 a distance appropriate for the particular container for which the machine is adapted.

Beyond the operative portion of the machine the guide rail 64 reassumes parallelism with the conveyer 52 to maintain the containers 56 in proper alignment as they progress along the discharge side of the conveyer 52. As is clearly shown in Fig. 1, the containers on the discharge side of the conveyer will assume spaced positions thereon because of their successive engagement with the notched discs 58 and 60. The path of travel of the containers 56 is diagrammatically illustrated in Fig. 34.

The mechanism thus far described is conventional and obviously any suitable modifications thereof may be employed, it being necessary only that a suitable supply of containers be furnished to the rotary turret devices in proper alignment with the operative elements thereof.

The containers 56 illustrated in the drawings comprise filled bottles to which closures 69 have been applied. These closures may comprise crown caps, screw caps or flanged or flared corks, or any other form of closure with which the use of banding sleeves is practicable. For the purposes of illustration it may be assumed that the closures 69 are the familiar, molded plastic screw caps.

It is the function of the machine herein disclosed to apply a banding sleeve to each of the containers 56. The form of banding sleeve chosen for illustration herein is the contractible cellulosic type which is applied in wet, expanded condition and is permitted to dry and shrink into tight engagement with the container. The sleeve may be positioned on the neck of the container or it may be desirable to position the sleeve in such a manner that a portion thereof will shrink into tight engagement with the container and another portion will shrink into tight engagement with the closure. This provides a breakable seal between the container and closure which must be destroyed before access may be had to the contents of the container. In either case it will be apparent that it is necessary for the machine herein disclosed to position the banding sleeves successively upon the necks of the bottles in an accurate and reliable manner.

To this end there is provided improved applying mechanism which serves to position the sleeves, as well as improved mechanisms for extracting the sleeves from a supply, insuring the opening of each sleeve from its collapsed condition and transferring the opened sleeves to the applying mechanism. The magazine, the opening and transferring mechanism and the applying the mechanism will be described in the order named in a general way in the present section of this specification and in detail in appropriately headed sections hereinbelow.

In Fig. 1 a magazine is generally indicated at 68. This magazine is supported upon a main frame member 70 arising from the base 40 of the machine. The magazine 68 is arranged to contain a single stack of collapsed banding sleeves in which the lowermost banding sleeve is exposed for engagement by the opening and transferring mechanism. In order to bring about such engagement it is necessary to cause a relative movement between the magazine and the opening and transferring mechanism. To this end the magazine is mounted for vertical movement relative to the frame member 70. An extension 72 is formed upon the magazine and is connected by a link 74 with a bell crank lever 76 pivoted at 78 within the base 40. A spring 80 may be provided to urge the bell crank lever 76 to rotate in a clockwise direction and to operate through the link 74 to urge the magazine 68 in a downward direction. A cam follower 82 is carried by the bell crank lever 76 for engagement with a disc cam 84 carried upon the main shaft 50. The cam 84 may be suitably contoured to impart vertical movement to the magazine 68 in proper timed relation with operation of other parts of the machine.

The opening and transferring mechanism is indicated generally at 86 in Fig. 1. This mechanism operates to remove the banding sleeves one at a time from the magazine 68 and to open the sleeves. This mechanism furthermore operates to position the opened sleeves for individual transfer to the applying mechanism. When a sleeve 88 is removed from the magazine it is in the flattened condition illustrated in Fig. 1a wherein the opposing walls 90, 91 are collapsed upon one another, and relatively sharp creases 92 are formed along lines parallel to the axis 94 upon which the sleeve is to be opened into the form of an open-ended cylinder. The opening and transferring mechanism 86 includes means for moving portions of the walls 90, 91 relative to each other to force other portions of these walls to separate. An example of such movement is shown in Fig. 1b wherein the central portions of walls 90, 91 have been moved relative to one another in the plane of contact of the inner surfaces thereof and in a direction generally parallel with the axis 94. Since the sleeve 88 is in the form of a continuous ring such relative movement will twist or distort the sleeve to such an extent that the inner surfaces of the walls 90, 91 will separate in regions 96 adjacent the creases 92. The air thus admitted between these portions of the inner surfaces of the walls 90, 91 will greatly facilitate separation of the remaining portions of the walls. In Fig. 1c it will be observed that the portions of the inner surfaces of walls 90, 91 adjacent the axis 94 are still in face to face contact in spite of the displacement of the walls in the direction of such axis. As stated above, however, these portions may be readily separated because of the separation which such displacement has caused in other regions of the sleeve. The principle herein involved may be embodied in various ways in addition to the particular manner herein illustrated. The displacement of the walls 90, 91 within the plane of contact of the inner surfaces thereof may be in any direction within such plane and may follow linear or curved paths. The opening and transferring mechanism 86 has been designed to displace the walls 90, 91 in what is believed to be the simplest manner calculated to produce a sufficient preliminary separation of the inner surfaces to facilitate mechanical completion of such separation.

After the preliminary separation discussed above, the separation may be completed by any suitable apparatus, and in the embodiment illustrated herein suction devices are brought into contact with opposite exterior surfaces of the walls 90, 91. The suction devices are then bodily separated to effect complete separation of the inner surfaces of the walls 90, 91. When such separation is effected the banding sleeve will assume a generally cylindrical shape, and in this condition it may be transferred to the applying mechanism.

The applying mechanism is incorporated in a turret 98 rotatable about the main shaft 50. As herein illustrated the turret includes two sleeve-applying units, one of which is indicated at 100 in Fig. 1, and these units are arranged in diametrically opposite positions with regard to the main drive shaft 50, as clearly shown in Fig. 4. The sleeve-applying units 100 are duplicates and accordingly, only one of these units will be described in detail hereinbelow. In general the sleeve-applying units rotate about the main shaft 50, and progressively operate to successively remove the opened banding sleeves from the transferring mechanism 86 and apply them individually to the containers 56.

*Banding sleeve magazine*

Figure 4:
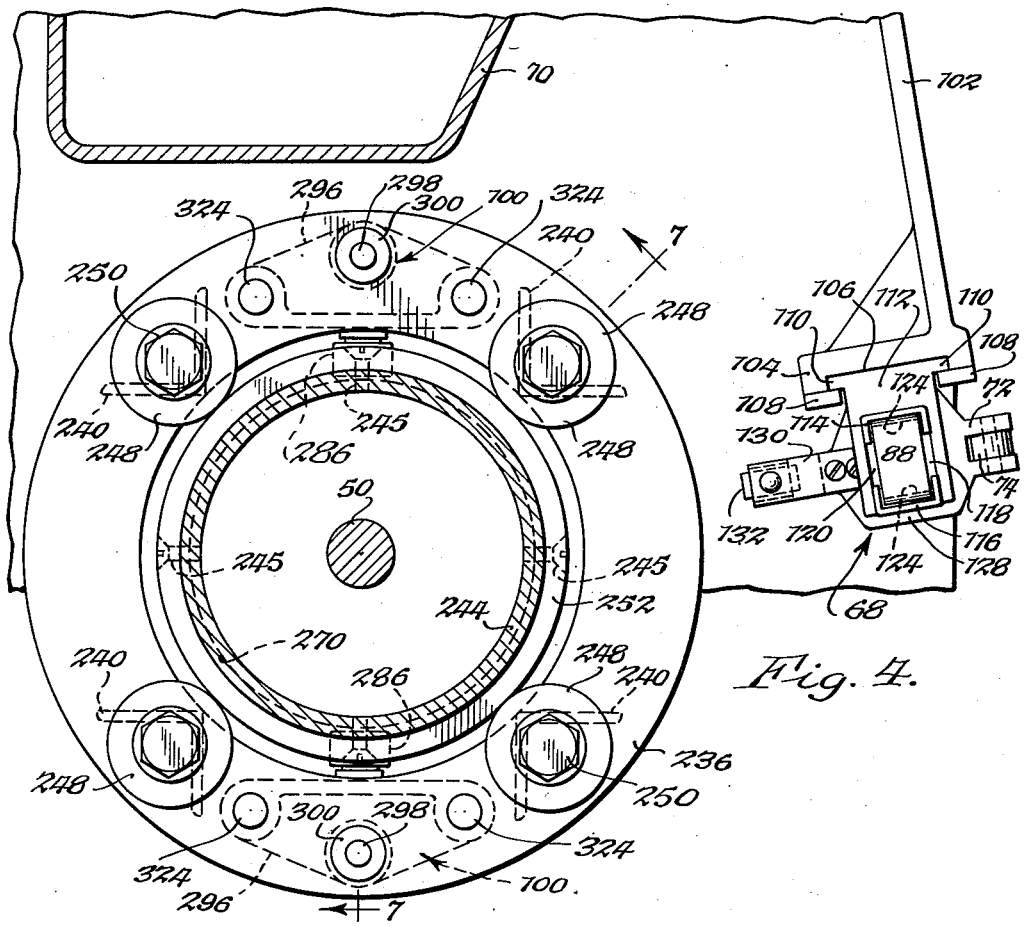
Fig. 4 is a fragmentary horizontal sectional view taken on line 4—4 of Fig. 3.

Referring particularly to Figs. 3 and 4, the magazine 68 is preferably constructed as follows: The frame member 70 includes a forwardly extending portion 102 upon which is formed a bracket 104 having a groove 106 extending therein in a vertical direction. To the walls defining the groove 106 there is secured a pair of rails 108 which extend inwardly over a portion of the groove 106 to define guides for the reception of flanges 110 formed upon a slide 112. The slide 112 comprises the support for the sleeve-carrying portion of the magazine. This sleeve-carrying portion is made up of two oppositely disposed, inwardly directed, channel-shaped members 114 and 116 held in proper spaced relationship with one another by strips 118, 120 connecting the flange portions of the members 114 and 116 (see Fig. 3). The space between the channel members 114 and 116 thus comprises a well of rectangular cross-section within which collapsed banding sleeves 88 may be stacked in a single stack disposed as illustrated in Fig. 4. Obviously the dimensions of this well will be chosen with regard to the specific size of banding sleeve which it is intended to use.

At the lower end of the well thus defined the flanges of the channel members 114 and 116 are cut away as indicated at 122 in Fig. 3. Beneath the level at which the flanges are thus cut away each of the channels 114 and 116 have secured thereto a narrow, horizontally disposed flange 124, one of which is shown in dotted lines in Fig. 3 (see also Fig. 4). The flanges 124 project inwardly toward one another and serve to form supports for the opposite creased ends of the banding sleeves 88. The flanges 124 thus support the stack of banding sleeves 88 located within the magazine and at the same time leave the major portion of the exterior surface of the lowermost sleeve exposed for engagement by the transferring mechanism 86. The flanges 124 are spaced from the cut-away ends 122 such a distance as to define an opening whose vertical dimension is approximately equal to the thickness of a single collapsed banding sleeve 88. This opening is illustrated in Fig. 3 at 126. It is through the opening 126 that the banding sleeves 88 are removed one at a time by the transferring mechanism 86.

The extension 72 and link 74 heretofore described in connection with Fig. 1 are shown in Fig. 4 and it will be observed that the extension 72 is formed as a part of a polygonal collar 128 secured to the magazine 68 adjacent the lower end thereof. Referring now to Fig. 3, it will be observed that there is also secured to the polygonal collar 128 a spring blade 130 upon the outer end of which is carried a friction roller 132 having a knurled surface or a surface of rubber, leather or the like. In Fig. 4 it will be seen that the roller 132 is narrower than a collapsed handling sleeve 88 and that it is positioned approximately centrally of the width of the banding sleeves 88 within the magazine 68. The lower peripheral surface of the roller 132 is arranged within a plane somewhat below the plane within which the lowermost banding sleeve 88 is supported within the magazine 68. This arrangement is for a purpose to be described hereinbelow.

From the above detailed description of the magazine it will be apparent that all of the elements mounted upon the slide 112 are movable vertically with respect to the frame member 70. The apparatus for effecting vertical movement of the magazine has been described above. Reference may be had to Figs. 13, 14 and 15 for an illustration of the extraction of the lowermost banding sleeve 88 from the magazine 68. Further reference will be made to these latter figures in the description of the transferring and opening mechanism.

*Opening and transferring mechanism*

A detailed description of the opening and transferring mechanism will be given with particular reference to Figs. 8 through 21. This mechanism is principally carried by a bracket 134 mounted for limited pivotal oscillation about the center of the main drive shaft 50 (see Figs. 8 and 18). As shown in these figures, bracket 134 comprises a generally horizontally disposed arm having formed thereon a hub 136 arranged concentrically with the shaft 50. The bracket 134 has suitable guideways formed thereon in which are received two separate slides. One of these slides 138 is shown in section in Fig. 19 and may be seen through rectangular openings 140 in the bracket 134 in Fig. 18. The slide 138 carries a bearing 139 which receives a shaft 141 on which is mounted an arm 142 having a perforated suction head 144 thereon. The arm 142 will be hereinreferred to as a suction arm and will be described in greater detail hereinbelow. The other slide 146 has formed thereon a rack 148 which meshes with a pinion 150 fixed to the shaft 141. The slides 138 and 146 may be moved jointly or independently in directions longitudinal of the bracket 134. When these slides are moved jointly there will be no relative movement between the rack 148 and pinion 150, and the arm 142 will therefore be maintained in its angular position but will, of course, be bodily displaced to the extent of displacement of the slide 138 upon which it is carried. When the slides 138 and 146 are moved relatively to one another the rack 148 and pinion 150 will operate to change the angular position of the arm 142. Whether or not the arm 142 is bodily displaced during such operation is dependent upon whether or not the slide 138 is itself moved. It will be apparent that proper manipulation of the slides 138 and 146 may be thus availed of to produce angular displacement and bodily displacement of the arm 142 in any manner or combination desired. A proper combination and sequence of such movements is employed in the present apparatus to remove a banding sleeve from the magazine 68, impart to it a preliminary opening operation, and complete the opening thereof in a position for transfer to the applying apparatus.

The limited pivotal oscillation of the bracket 134 about the center of shaft 50 is availed of to move a banding sleeve carried thereby in the path of rotation of the turret 98 for a sufficient period of time to permit transfer of such banding sleeve to one of the applying units 100. When the transfer has been effected the bracket 134 swings back to a position for removal of another banding sleeve from the magazine 68. It will be appreciated that since there is provided herein a single transferring and opening mechanism 86 and that there are two units 100 in the turret 98 the mechanism 86 will have to perform two complete operations for each rotation of the turret 98. It is preferred to make use of the main drive shaft 50 for actuation of the mechanism 86, and to this end it was found to be desirable to provide cams driven by the shaft 50 and properly contoured for actuation of the slides 138 and 146 of the mechanism 86. It will be apparent from a consideration of the description hereinbelow that the movements of the slides 138 and 146 are relatively complex. Thus to avoid the necessity for providing cams of large diameter with duplicate contours in each 180° segment thereof, it has been found to be decidedly advantageous to provide for driving the control cams for the mechanism 86 at an angular speed twice that of the main drive shaft 50.

One form of mechanism for this purpose is illustrated in Fig. 12 wherein a gear 152 is keyed to the shaft 50. The gear 152 meshes with a pinion 154 upon a stub shaft 156 suitably supported in a bracket 41 mounted on the base 40 of the machine. A gear 158 is also carried by the stub shaft 156. The gear 158 and pinion 154 are fixed to one another for joint rotation and may be formed integrally as shown in Fig. 12. The gear 158 meshes with a pinion 160 keyed to a sleeve 162 rotatably mounted upon the shaft 50. The pitch diameters of the gears 152 and 158 and pinions 154 and 160 are such as to establish a ratio of 1:2 between the shaft 50 and sleeve 162. Thus upon each revolution of the shaft 50 the sleeve 162 will make two revolutions about the center of the shaft 50 and in the same direction of rotation.

Referring to Fig. 8, it will be observed that the sleeve 162 extends upwardly of the shaft 50 for a distance sufficient to carry a number of elements of the machine. It will also be observed that the hub 136 of bracket 134 bears upon the exterior surface of the sleeve 162 and is free for rotation relative thereto.

The sleeve 162 has fixed for rotation therewith cams 164, 166 and 168 which are provided for actuation of the opening and transferring mechanism. The cam 164 is provided with a groove 170 which receives a roller follower 172 carried by an upward extension 174 of the slide 146 upon which is formed the rack 148. The slide 146 extends through a suitable guide 176 secured to the bracket 134. An extension 178 may be formed on the guide 176 which serves as a guide rail for the extremity of the slide 146 in which the rack 148 is formed.

The cam 166 has formed therein a groove 180 which receives a roller follower 182 carried by a downward extension 184 formed upon the slide 138. The slide 138 (see Fig. 19) may be formed with flanges 185 riding in suitable grooves within the bracket 134.

The slides 146 and 138 may thus be moved lengthwise of the bracket 134 in accordance with the changes in contour of the cam grooves 170 and 180, respectively.

The cam 168 is provided with a groove 186 which receives a roller follower 188 carried by a rock arm 190. As shown in Fig. 9, the rock arm 190 is keyed or otherwise secured to a shaft 192 extending upwardly through a suitable bearing 194 in the base 40 of the machine. Referring now to Fig. 18, the shaft 192 has secured thereto a gear segment 196 which meshes with a gear segment 198 formed upon the hub 136 of the bracket 134. The contour of the cam groove 186 may be so designed as to rock the arm 190, shaft 192 and gear segments 196 and 198 to produce limited pivotal oscillation of the bracket 134 about the center of the shaft 50.

The cam groove 186 just described is so contoured and timed with the remainder of the machine as to swing the bracket 134 in the same direction and at the same angular speed as that of the shaft 50 at the proper time for transfer of a banding sleeve from the mechanism 86 to a sleeve-applying unit 100. When transfer has been effected the bracket 134 is swung in a reverse direction, after which the bracket 134 remains stationary for a sufficient period of time to permit removal of the next banding sleeve from the magazine 68. From an inspection of Fig. 9 it will be apparent that the roller follower 188 has just entered a portion of the cam groove 186 which is concentric with the shaft 50. Thus the parts are in a position corresponding to that in which extraction of a new banding sleeve from the magazine 68 is about to occur. Beyond this portion of the cam groove 186 there is a rise within which the bracket 134 is swung with the shaft 50. Beyond this rise there is a fall within which the bracket returns to its initial position.

The cam 166 is shown in Fig. 10 while the cam 164 is shown in Fig. 11. In each of these figures the circle around the center of shaft 50 is divided into segments by radial lines lettered, respectively, a through j. The roller followers 182 and 172 are shown in these figures in the position a. This position corresponds to the position of the roller follower 188 in Fig. 9 and accordingly represents the position of the mechanism 86 at the time extraction of a new banding sleeve from the magazine 68 is about to occur. In this position the relationship between the slides 138 and 146 is such that the suction arm 142 stands erect, as illustrated in Fig. 8.

The magazine 68 is in its upper position and the first operation to occur is a lowering of the magazine through the operation of the cam 84, shown in Fig. 1. During this time the cams 166 and 164 rotate a distance represented by the segment a—b. Within this segment the grooves in both cams are concentric and no movement of either of the slides will occur. When the magazine has lowered to bring the lowermost banding sleeve 88 therein in contact with the perforated head 144 of the suction arm 142 the parts will be in position illustrated in Fig. 13. By means which will be described hereinbelow suction is applied to the head 144 whereupon the lowermost banding sleeve 88 will be caused to adhere to the head.

Continued rotation of the cams 164 and 166 through the segment b—c will bring portions of the cam grooves 170 and 180 into play which are effective to move both followers 172 and 182 inwardly radially at the same linear speed. The slides 146 and 138 thus move jointly and the suction arm 142 is moved bodily to the position shown in Fig. 14 without any angular movement. The lowermost banding sleeve 88 will be withdrawn in a horizontal direction from the magazine 68 and will continue to adhere to the head 144 as a result of continued application of suction.

Continued rotation of the cams 164, 166 through the segment c-d will bring portions of the respective cam grooves into play which produce relative movement between the slides 146 and 138. The groove 180 of cam 166 is concentric while the groove 170 of the cam 164 is directed outwardly of the center. Thus the slide 146 is moved radially outwardly of the bracket 134 causing the pinion 150 and suction arm 142 to swing in a counterclockwise direction as viewed in Figs. 8 and 15. Within the segment c—d the arm 142 is swung through 90° whereupon it assumes the position shown in full lines in Fig. 15. In the course of such swinging movement the banding sleeve 88 carried by the suction arm 142 is brought into contact with the friction roller 132 as shown in broken lines in Fig. 15. This contact occurs before the magazine 68 moves upwardly. If it is borne in mind that the banding sleeve 88 is held to the suction arm 142 by suction exerted against the outer surface of the lowermost wall 91 thereof it will be apparent that the upper wall 90 may be moved relative to the lower wall 91. The characteristics of the friction roller 132, both as to surface and resistance against rotation, and the pressure exerted by the leaf spring 130 are so chosen as to exert sufficient drag upon the outer surface of the upper wall 90 to displace the upper wall relative to the lower wall in the manner illustrated in Fig. 1b. As explained above, such displacement results in what might be termed "breaking the vacuum" between the heretofore intimately contacting inner surfaces of the opposing walls 90 and 91. Thus the friction roller 132 comprises one mechanical embodiment of a means for effecting a displacement of the type discussed above in connection with Figs. 1a, 1b and 1c. If so desired the cam groove 170 of cam 164 may be made slightly irregular within the segment c—d to impart irregular swinging movement to the arm 142 to accentuate introduction of air between the walls 90, 91 of the sleeve 88.

When the suction arm 142 has moved beyond the friction roller 132 the magazine 68 may be moved upwardly into the position illustrated in full lines in Fig. 15. Such operation is performed by the cam 84 shown in Fig. 1.

Further rotation of the cams 164 and 166 through the segment d—e brings into play portions of the cam grooves 170 and 180 which produce joint inward radial movement of the slides 146 and 138, respectively. The suction arm 142 is thus bodily moved into the position illustrated in full lines in Fig. 16 without angular movement about its pivot.

In this position the outer surface of the wall 90 of the banding sleeve 88 is brought into contact with a perforated suction head 200 fixed to the bracket 134. At about this time suction is applied to the head 200 by means which will be more fully described hereinbelow, and the wall 90 will thereupon be adhered to the suction head 200. The preliminary opening of the banding sleeve 88 which has occurred as a result of its contact with the friction roller 132 may be sufficient to permit opening of the sleeve to be completed by moving the suction head 142 radially outwardly of the bracket 134 whereby to carry the wall 91 away from the wall 90. If desired, however, an additional preliminary opening operation may be performed upon the sleeve 88 prior to the aforesaid radial movement of suction arm 142. As a matter of fact, the entire preliminary opening operation may be performed in the manner about to be described, thereby eliminating the friction roller 132. It is preferred, however, to make use of both of the preliminary opening means disclosed herein.

This further preliminary separation of the walls 90 and 91 may be effected during rotation of the cams 164 and 166 through the segment e—f. To this end the groove 170 of cam 164 may be made irregular in contour within the segment e—f, while the contour of groove 180 remains regular. Since the contours of the two cam grooves 170 and 180 do not match within the segment e—f a relative movement will occur between the slides 146 and 138. Such relative movement will cause angular movement or rocking of the suction arm 142, as illustrated in broken lines in Fig. 16. It will be apparent that since the wall 91 is adhered to the suction arm 142 and the wall 90 is adhered to the suction head 200 these two walls will be subjected to a facewise slipping motion similar to that illustrated in Fig. 1b.

Immediately that the preliminary opening operation just described is performed the suction arm 142 is moved away from the suction head 200. This occurs during rotation of the cams 164 and 166 through the segment f—g within which both cam grooves 170 and 180 are outwardly directed in such manner as to move both slides 146 and 138 radially outwardly at the same rate of speed.

During movement of the cams 164 and 166 through the segment f—g the cam 168 is rotated into such position as to initiate movement of the bracket 134 about the center of the drive shaft 50. Such movement is in the same direction of rotation and at the same angular speed as the shaft 50. Thus when the machine reaches the position represented by the radial line g the sleeve 88 will be completely opened and will be moving in the same direction and at the same speed as the sleeve-applying unit 100 of the turret 98 to which the sleeve is to be transferred. The operation of transferring occurs during rotation of the cams 164 and 166 through the segment g—h, and it will be noted that through this segment the contour of both of the cam grooves 170 and 180 is concentric. When the position represented by radial line h is reached transfer has been completed and the cam 168 has reached a position such that the bracket 134 stops and reverses its motion whereby to return to its initial position. The reversing operation continues through the entire segment h—a.

Within the segment h—i the parts upon the bracket 134 remain stationary relative to one another and the cam grooves 170 and 180 are both concentric.

When the cams 164 and 166 reach the position represented by the radial line i the roller follower 172 reaches a portion of the cam groove 170 directed inwardly toward the center of the cam 164, while the roller follower 182 continues to move within a portion of the cam groove 180 which is concentric. Thus the slide 146 will be moved inwardly radially of the bracket 134 and relatively to the slide 138. Such movement produces rotation of the pinion 150 and suction arm 142 in a clockwise direction through 90° to return the suction arm 142 to an erect position. This latter movement occurs during travel of the cams 164 and 166 through the segment i—j.

As the cams move through the segment j—a the bracket 134 continues its return movement and the roller follower 182 traverses a portion of the cam groove 180 which is directed outwardly of the cam 166 in such manner as to move the slide 138 outwardly of the bracket 134 at the same linear speed as that of the slide 146. The suction arm 142 is thus bodily moved to the extremity of the bracket 134 into a position for repetition of the cycle just described. This latter position is that illustrated in Fig. 8.

Suitable means must be provided for applying and relieving suction at the proper times for engagement and release of the banding sleeve 88.

Referring first to Fig. 19, the suction arm 142 is provided with a passageway 202 communicating with the hollow portion 204 of the head 144. The passageway 202 terminates in an opening formed in one vertical face of the suction arm 142 within the area confined by the bifurcated portion of the bearing 139. This opening communicates with an arcuately shaped port 206 formed in one of the legs of bearing 139, and the port 206 communicates with a passageway 208 extending through the bearing 139 and into the slide 138. The arrangement just described is such that the suction head 144 and the passageway 208 are in communication in all angular positions of the suction arm 142.

Referring now to Fig. 8a, it will be observed that the passageway 208 communicates with a horizontally disposed passageway 210 which extends radially inwardly of the slide 138 and terminates at its inner end in a port 212. The bracket 134 has formed therein an elongated port 214 which is of such length as to remain in constant communication with the port 212 irrespective of the position of the slide 138 upon the bracket 134. The port 214 is connected with a horizontal passageway 216 which extends, as shown in Fig. 8, through the hub portion 136 of the bracket 134. The passageway 216 opens into the inner bearing surface of the hub 136.

The suction head 200 is formed in the bracket 134 as pointed out above, and as shown in Fig. 8 it is provided with a passageway 218 which extends from the hollow portion of the suction head radially inwardly of the bracket 134 and opens through the inner bearing surface of the hub 136.

In Fig. 20 there is shown one form of valve means which may be so designed as to connect the suction head 200 with a suitable source of suction and to disconnect the same at the proper time within the cycle of operations. The sleeve 162 is provided with a portion 220 which extends circumferentially of the sleeve for a substantial distance. The port 220 is arranged to communicate with the passageway 218 upon rotation of the sleeve 162 to a predetermined position. The drive shaft 50 has a hole 222 drilled diametrically therethrough which communicates with a vertical passageway 224 extending lengthwise of the drive shaft 50.

It will be recalled that in the embodiment chosen for illustration the turret 98 is provided with two sleeve-applying units 100 which are disposed in diametrically opposite positions upon the turret. It will also be recalled that the sleeve 162 rotates twice for each single rotation of the main drive shaft 50. Thus the opposite ends of diametral hole 222 serve alternately as a port communicating with the port 220. The position illustrated in Fig. 20 corresponds to that represented by radial line a in Figs. 10 and 11. When the sleeve 162 rotates in its counterclockwise direction to the position represented by the radial line e the port 220 will have reached a position in which it opens into the passageway 218. During this time the diametral hole 222 will have advanced an angular distance one half that of the port 220 into a position in which one end or the other thereof will open into the port 220. When this communication occurs suction is applied to the head 200.

Since the port 220 extends circumferentially of the sleeve 162 suction will continue to be applied to the head 200 for a period of time sufficient to permit opening of the banding sleeve 88 and holding of the same in opened position until the proper sleeve-applying unit 100 has entered and engaged the banding sleeve 88 in the manner to be described below. At this time the sleeve 162 will have progressed to such a point that suction is terminated.

In Fig. 21 a valving arrangement is shown for the suction arm 142. In a position opposite the passageway 216 the sleeve 162 has formed therein a circumferential port 226. It will be observed that the port 226 extends through more than one half the circumference of the sleeve 162 and accordingly there is provided a skeleton structure 228 to increase mechanical strength at this point. Nevertheless, the port 226 is continuous throughout the indicated portion of a circumference. The shaft 50 is provided with oppositely disposed ports 230 which extend circumferentially of the shaft for a considerable distance and which communicate with the passageway 224. The ports 226 and 230 are so dimensioned that they will interconnect the passageways 216 and 224 from the time the opening and transferring mechanism reaches a position within the segment a—b until the proper sleeve-applying unit 98 has engaged the sleeve at a point within the segment g—h. Thus suction is applied after the magazine 68 moves downwardly to bring the lowermost sleeve 88 therein into contact with the suction head 144 and continues to be applied until transfer is to be effected.

It will be observed that one or the other of the ports 230 will be in operative position at the beginning of a cycle of operation of the opening and transferring mechanism. This of course depends upon which of the sleeve-applying units 100 is moving into position to engage a sleeve.

The passageway 224 extends upwardly of the shaft 50 in order that it may communicate with parts of the turret to be described hereinbelow. This passageway also extends downwardly of the shaft 50 into the base 40 of the machine. Referring now to Fig. 1, there is provided a suitably packed suction box 232 connected by a main suction pipe 234 to a suitable source of suction such as a vacuum pump. The passageway 224 within the shaft 50 is arranged to communicate continuously with the interior of the suction box 232.

*Turret and sleeve-applying units*

The turret 98 and the sleeve-applying units carried thereby will now be described with particular reference to Figs. 3 through 7a. The operation and timing of these elements will then be described with particular reference to Figs. 22 through 34. As stated above, the sleeve-applying units 100 are duplicates and only one of them will be described in detail. It should be pointed out at the outset that these units operate successively to take an opened banding sleeve from the opening and transferring mechanism 86 and apply such sleeve to successively presented containers 56. To this end the units 100 are diametrically positioned upon the turret 98 in the embodiment chosen for illustration. Obviously it is a matter of choice in the interests of sound machine design to make use of a single sleeve-applying unit or more than two sleeve-applying units. In the design of the present machine it has been found to be preferable to use the two units herein illustrated.

Referring first to Fig. 1, the rotary part of the turret comprises spaced upper and lower plates 236 and 238 connected by vertically disposed angle irons 240. The structure thus formed rotates about the center of the main drive shaft 50. The frame member 70 is provided with a forwardly extending hood or cover portion 242 to which is rigidly secured a cylindrical body 244 arranged concentrically with the shaft 50. The cylindrical body 244 is thus fixed against rotation and it serves as the support for the non-rotary portions of the turret 98.

Figure 5:
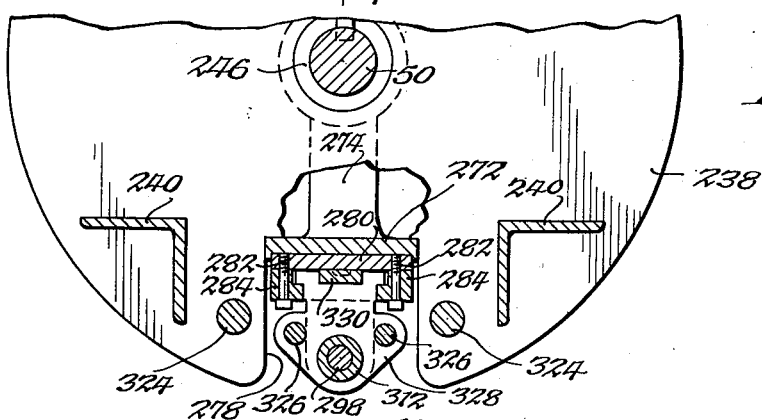
Fig. 5 is a similar sectional view taken along the line 5—5 of Fig. 3.
Figure 6:
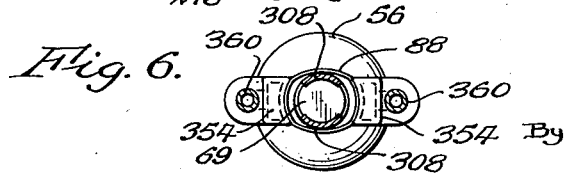
Fig. 6 is a similar sectional view taken along the line 6—6 of Fig. 3.

Referring to Fig. 3, it will be observed that the section line 4—4 lies above the upper plate 236 and that the section line 5—5 lies just above the lower plate 238. Then referring to Fig. 4 it will be apparent that the upper plate 236 is in the form of a flat ring, the inner circumference of which is spaced from the non-rotary part of the turret supported by the cylindrical body 244. In Fig. 5 the lower plate 238 is shown as comprising a substantially complete circle. The angle irons 240 are secured to the upper and lower plates 236 and 238, respectively, and in the embodiment illustrated four angle irons 240 are provided. Figs. 4 and 5 also show that the sleeve-applying units 100 extend between and are carried by the upper and lower plates 236 and 238.

Figures 7, 7A:
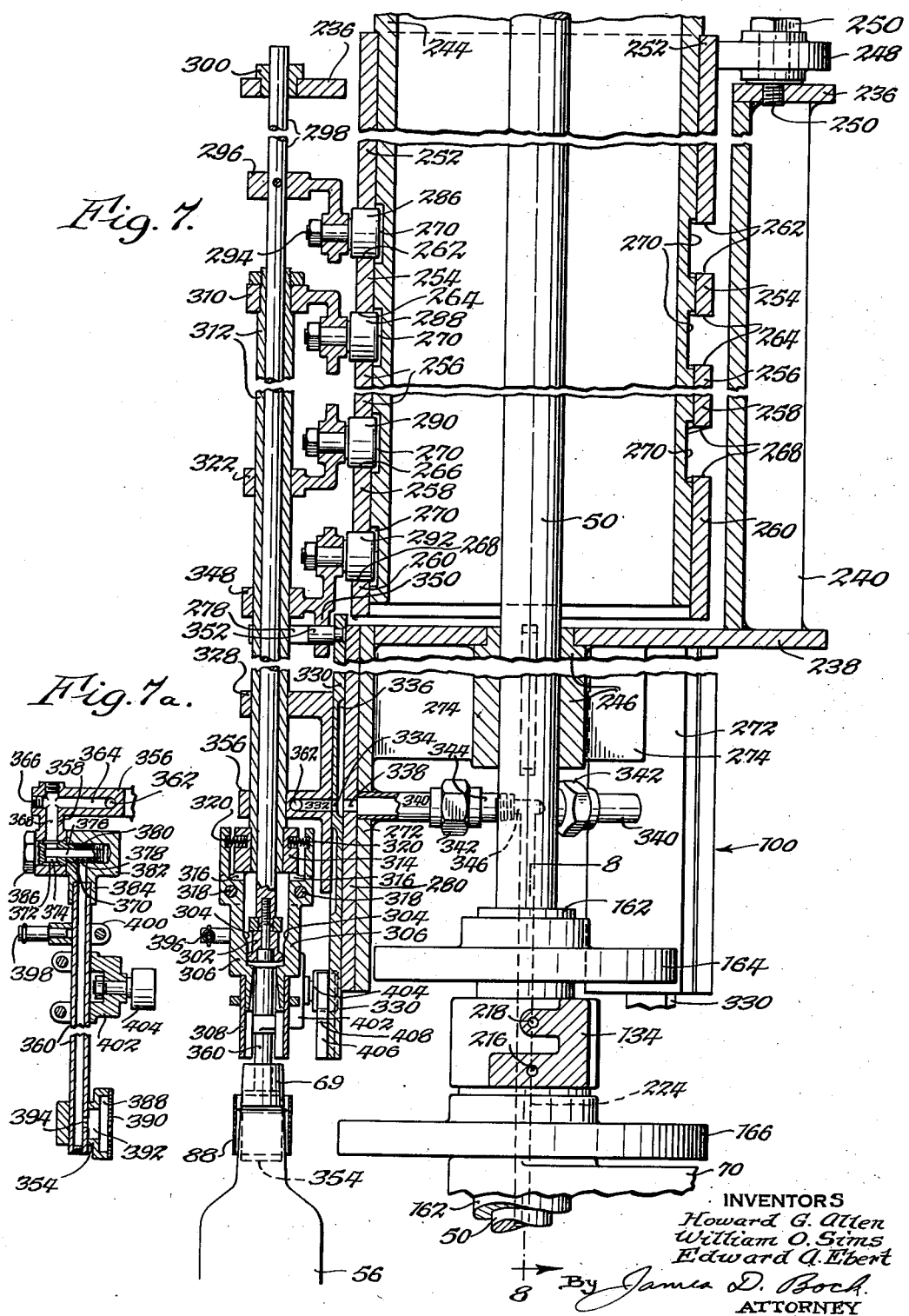
Fig. 7 is a fragmentary transverse vertical sectional view taken along the line 7—7 of Fig. 4, which line indicates intersecting vertical planes.
Fig. 7a is a fragmentary vertical sectional view taken along the line 7a—7a of Fig. 3, in which certain parts have been turned through 90° for clarity of illustration.

Referring now to Fig. 7, the lower plate 238 has secured thereto a hub 246 which is keyed to the shaft 50. Thus the lower plate 238 and the turret structure attached thereto rotate with the shaft 50. The upper plate 236 is provided with a plurality of anti-friction rollers 248 carried upon headed studs 250. As shown in Fig. 4, there are four of the rollers 248 spaced around the circumference of the upper plate or ring 236. The inner peripheral surfaces of the rollers 248 bear against the outer surface of a cylindrical body 252 which is fixed against rotation by securing it to the fixed cylindrical body 244 as by screws 245. The cylindrical body 252 will be more fully described hereinbelow, but it is apparent that the surface thereof and the rollers 248 provide a bearing for the upper portion of the rotary parts of the turret.

The cylindrical body 252 referred to above is one of a plurality of such bodies 254, 256, 258 and 260 fixed upon the outer surface of the cylindrical body 244. The adjacent edges of each of these bodies are irregularly contoured for the purpose of defining between such bodies a plurality of cam grooves. In Fig. 2 the bodies 252, 254, 256, 258 and 260 and the cam grooves 262, 264, 266 and 268 are shown in developed form. Also in Fig. 2 various positions of the turret mechanism relative to the cam grooves are represented by broken vertical lines numbered from 1 through 12. The numbers used in this figure correspond with the numbers 1 though 12 used in the timing chart shown in Fig. 34.

The structure just described comprises a fixed barrel cam around which the rotary portions of the turret 98 rotate during operation of the machine. The cam grooves 262, 264, 266 and 268 are properly contoured to cause operation of various movable elements in the sleeve-applying units 100. If so desired the fixed cylindrical body 244 may be recessed as indicated at 270 behind each of the cam grooves to provide clearance for the roller followers which will be described below.

Certain operative parts of the sleeve-applying mechanism extend below the general level of the lower plate 238. These parts are supported by downwardly projecting plates 272 (see Fig. 7) which are secured at the outer ends of two spokelike members 274 projecting radially from the hub 246. The plates 272 extend upwardly into notches 278 (see Fig. 5) in the lower plate 238. It will be noted with regard to Fig. 5 that the section line 5—5 in Fig. 3 along which Fig. 5 is taken drops downwardly within the notch 278 whereby the plate 272 shown therein is shown in section. It will also be noted that parts of plates 272 have been omitted in Fig. 3 to avoid confusion. However, it will be apparent from Fig. 7 that the plates 272 terminate at their upper ends within the plane of the upper surface of the lower plate 238. The plates 272 are thus diametrically opposed with regard to the main drive shaft 50 and are rigidly secured to the rotary parts of the turret 98. To each of the plates 272 there is secured a spacer plate 280. To each of the plates 280 (see Fig. 5) there are secured as by screws 292 L-shaped guide members 284, the inwardly-projecting, overhanging portions of which define with the spacer plate 280 guide channels within which certain movable parts of the sleeve-applying mechanism are guided for vertical motion.

It will be noted with regard to Fig. 7 that the section line 7—7 of Fig. 4 along which Fig. 7 is taken passes through the center of one of the sleeve-applying units 100 and into the center of the drive shaft 50. The section line 7—7 then extends from the center of shaft 50 through the center of one of the anti-friction rollers 248. Fig. 7 therefore reveals the internal construction of one of the sleeve-applying units 100 and shows only a rear, angular view of the other sleeve-applying unit.

The sleeve-applying units 100 will now be described with particular reference to the unit 100 shown in section in Figs. 7 and 7a. Disposed in vertical alignment for engagement respectively in the cam grooves 262, 264, 266 and 268 are roller followers 286, 288, 290 and 292. The roller follower 286 is rotatably mounted on a horizontal stud 294 carried by a casting 296. The casting 296 is formed with a laterally offset, hublike portion which surrounds and is secured to a vertical rod 298, the upper end of which is slidably guided in a bearing 300 carried in the upper plate or ring 236. The lower end of the rod 298 has secured thereto a head or button 302 disposed to cooperate with a pair of diametrically opposed internal cams or shoulders 304 formed on a pair of similar but opposed castings 306 from the lower ends of which depend fingers or spreaders 308.

The roller 288 which rides in the cam groove 264 is journaled in a manner similar to that described in connection with the roller 286 to a casting 310 secured to the upper end of a tube 312 slidably mounted upon the rod 298.

At its lower end the tube 312 has secured to it a casting 314 having a pair of oppositely-disposed bifurcated bearing lugs 316, each of which carries a pivot pin 318. The casting 314 and lugs 316 are clearly shown in Fig. 3. The pivot pins 318 each serve as a pivotal support for the finger-carrying castings 306 mentioned above. The axis of the pins 318 is so disposed that the fingers 308 may swing toward and from the vertical axis of the rod 298. The fingers 308 are yieldably urged toward one another and toward said vertical axis by means of compression springs 320 confined between the casting 314 and upward extensions of the finger-carrying castings 306. The fingers 308 may thus be swung toward and from the vertical axis of rod 298 under influence of the head or button 302 when movement thereof relatively to the cams 304 is produced.

In the position of the parts shown in Fig. 7 the head 302 has been moved down between the cams 304 to separate or expand the fingers 308 to the maximum extent desired. Upon relative movement between the head 302 and cams 304 such as to carry the head 302 over the inclined portions of the cams 304 the fingers 308 will swing toward one another under the influence of springs 320 and thus assume a collapsed position. The cam grooves 262 and 264 are so contoured as to cause a proper combination of joint and independent vertical movements of the rod 298 and tube 312 whereby to collapse and expand the fingers 308 and move them vertically in collapsed or expanded position during rotation of the turret.

The roller follower 290 which rides in the cam groove 266 is journaled in a casting 322 having formed therein a laterally extending hub-like portion similar to that described above in connection with the castings 296 and 310. The hub-like portion of casting 322 surrounds and is slidable relative to the tube 312 to permit relative vertical sliding motion between the casting 322 and tube 312. Referring now to Fig. 3, it will be observed that the casting 322 is similar to the castings 296 and 310 in a manner not heretofore described. Each of these castings includes oppositely-disposed guiding portions which are apertured to embrace in sliding relation a pair of vertical guide rods 324 fixed at their upper and lower ends, respectively, to the upper plate 236 and the lower plate 238. The structure just described prevents the castings 296, 310 and 322 from rotating about the axis of the rod 298. The casting 322 has fixed thereto the upper ends of parallel vertical rods 326 which are disposed in a generally opposed relationship with regard to the axis of the rod 298 and tube 312. At their lower ends the rods 326 are secured to a casting 328.

Referring now to Fig. 7, the casting 328 may be seen in section, and it should be observed that in Fig. 7 the rods 326 as well as the rods 324 have been omitted to avoid confusion of the showing. The rear or inner vertical wall of the casting 328 is in slidable engagement with a sliding valve member 330 mounted for vertical, reciprocatory movement in the guide channel defined by elements 280 and 284 described above and shown in Fig. 5. The sliding valve member 330 has a horizontal radial passage 332 which in one vertical position of the parts communicates with a hole 334 in the slide 330. The hole 334 communicates with a long, vertically disposed port 336 formed in the slide 330. The plate 280 has formed therein a hole 338 which communicates with the long port 336 and which also communicates with the outer end of a pipe 340 connected by a suitable nipple 342 with a short section of pipe 344 threaded into the main drive shaft 50. The pipe 344 communicates with a passage 346 within the shaft 50 which in turn opens into the vertical passageway 224 which has been described above. The slide valve arrangement and other parts just described are thus connected through the passageway 224 with the source of suction heretofore described.

The roller follower 292 which rides in the cam groove 268 is journaled to a casting 348 similar to the castings 296, 310 and 322 described above. The casting 348 is, however, apertured to permit the free passage therethrough of the slide rods 326, as is clearly shown in Fig. 3. Thus the casting 348 and the rods 326 may move relative to one another in vertical directions. Referring back to Fig. 7, the casting 348 has formed thereon a downwardly projecting portion 350 which is apertured centrally of the rod 298 to receive a stud 352 which is secured to the sliding valve plate 330. Thus upward and downward motion of the roller 292 in its travel within the cam groove 268 will produce upward and downward motion of the sliding valve plate 330. From an inspection of Fig. 7 it will be apparent that the hole 334 in the valve plate 330 may thus be moved into and out of registry with the horizontal passageway 332 in the casting 328. Inasmuch as the casting 328 may be moved upwardly and downwardly in accordance with the travel of the roller 290 in the cam groove 266 it will be apparent that, depending upon the design of the cam grooves, the hole 334 and passage 332 may be maintained in or out of alignment at will. If it is desired to maintain alignment it is only necessary to move the casting 328 and sliding valve member 330 jointly, whereas any relative movement of substantial nature will result in misalignment. It will be recalled that the port 336 communicating with the hole 334 is elongated to such an extent as to maintain constant communication with the hole 338 and with the pipe 340 leading to the source of suction. Thus the horizontal passageway 332 may be connected with or disconnected from the source of suction at will.

The casting 328 which has just been described is provided as a movable support for an oppositely disposed pair of suction pads 354 which are swingable toward and from each other and toward and from the vertical axis of the rod 298 in a plane normal to the plane in which the fingers 308 are swingable.

In Fig. 7 the casting 328 is shown as including two forwardly projecting portions which embrace in slidable relation the tube 312. The lower of these projecting portions is identified by the reference numeral 356 and it is in this forwardly projecting portion 356 that the horizontal passageway 332 is located. Referring now to Fig. 3, the forwardly projecting portion 356 of casting 328 is shown in elevation, and it will be observed that this portion has formed thereon two oppositely-disposed, downwardly projecting extensions 358. The suction pads 354 mentioned above are mounted on the lower ends of tubular arms 360 whose upper ends are swiveled to the extensions 358 along axes that are perpendicular to the plane in which Fig. 3 is drawn.

Referring back to Fig. 7, the forwardly extending portion 356 of the casting 328 is shown as having formed therein a passageway 362 which extends transversely of and communicates with the radially horizontal passage 332. The passageway 362 extends cross-wise of the casting 328 and beyond the vertical axis of rod 298 on both sides thereof. Passageways 364 extend from opposite ends of the passageway 362 forwardly of the projecting portion 356. The two passageways 364 may be drilled in from the front of the casting and each may be closed off by suitable means such as a screw plug 366.

From this point on the description will be directed to Fig. 7a and will be limited to the suction pad mechanism through which the section line 7a—7a runs. It will be understood that the other suction pad mechanism is a mirror image.

The downwardly projecting portion 358 has formed therein a vertical passageway 368 which communicates with passageway 364. This downward extension 358 also has formed therein a horizontally disposed bearing boss which receives a rotatable swivel body 370. The swivel body 370 has formed therein an annular groove 372 arranged to communicate with the vertical passageway 368 in all positions of rotation of the swivel body 370. One or more passageways may be drilled within the annular groove 372 as shown at 374 to communicate with a horizontally disposed passageway 376 generally coinciding with the axis of the swivel body 370. At the opposite end of the swivel body similar radial passageways 378 communicating with an annular groove 380 are provided. A hub 382 is fitted over the latter end of the swivel body and is brought into airtight rotatable engagement with the downwardly projecting portion 358 of the casting by means such as a cap screw 386. The hub 382 has a hollow extension 384 formed thereon in such position as to communicate with the annular groove 380.

The tubular arm 360 heretofore mentioned is mounted in the hollow extension 384 of hub 382 whereby the arm 360 may swing about the swivel and remain in constant communication with the passageway 332 in the casting 328.

It will be observed in Fig. 7a that the suction pad 354 therein illustrated has been turned through 90° relative to the other parts in said figure to illustrate the internal construction thereof. The pad 354 is secured to the lower closed end of the tubular arm 360 and is provided with a hollow portion 388 and a perforated face plate 390 against which one wall of the banding sleeve 88 may be adhered. The hollow portion 388 communicates through a passageway 392 and a suitable opening 394 in the tubular arm 360 with the interior of said arm.

Referring now to Fig. 3 wherein both of the tubular arms 360 are illustrated, it will be observed that a contractile spring 396 is secured at its opposite ends to studs 398 carried by clamps 400 secured to each of the suction arms 360. The spring 396 urges the arms 360 to swing toward one another about their respective swivel mechanisms.

Each of the arms 360 also carries clamp members 402 upon the rear of each of which is rotatably mounted a roller 404 (see Fig. 7a). A cam plate 406 is secured to the lower end of the sliding valve plate 330 (see Fig. 7) and the rollers 404 are arranged within the plane of said cam plate 406 whereby the spring 396 will yieldably urge the rollers 404 against the opposite edges thereof. As shown in Fig. 3, each of the opposite edges of the cam plate 406 have formed therein an incline 408. When the rollers bear against the edge portions of the cam plate 406 above the inclines 408 the suction pads 354 will be relatively close together and in the position illustrated in Fig. 3 and Fig. 29, for example. Upon relative vertical movement between the cam plate 406 and the rollers 404 such as to carry the rollers over the inclines 408 the suction pads 354 will be moved farther apart into the position shown, for example, in Figs. 22 and 28.

The relative movement between cam plate 406 and the rollers 404 may be produced by independent vertical movement of the slide 330 or the casting 328 or by joint vertical movement thereof at different speeds. Obviously the contour of the barrel cam grooves 266 and 268 may be so designed as to produce such relative motion at any desired time.

Operation

The operation of the various mechanisms above described has been quite completely set forth in connection with the detailed description. Accordingly it will be necessary only to describe the operations of the various parts from the standpoint of the relative timing of such operations necessary to produce the desired result. The description of the operation will therefore be based principally upon the timing diagram in Fig. 34 with further reference to the diagrammatic Figs. 22 through 33.

The operation of the opening and transferring mechanism 86 has been quite fully set forth hereinabove. In such description the operation of this particular mechanism was carried to the position of parts illustrated in Fig. 17 wherein a banding sleeve 88 is held in open position between the suction heads 144 and 200. The description of this mechanism has also brought out that the bracket 134 is moved about the center of the main vertical drive shaft 50 at an angular speed corresponding to the angular speed of the constantly rotating turret 98.

It will be apparent that such angular movement of the bracket 134 must occur when a sleeve-applying unit 100 has reached a position of vertical alignment with the opened sleeve 88. Referring now to Fig. 34, the radial center line of the bracket 134 occupies an angular relationship corresponding to the radial line 2 during operation of the mechanism 86 to extract a sleeve 88 from the magazine 68 and to perform the preliminary opening of the sleeve 88. Thus the operations of the mechanism 86 which occur during rotation of the cams 164 and 166 (see Fig. 11) through the segment a—f all occur while the bracket 134 remains in the angular position 2 of Fig. 34. In the meantime a sleeve-applying unit 100 has completed application of a sleeve to a container and has progressed in a counterclockwise direction to the position 1 with the parts thereof in the position shown in Fig. 22a and diagrammatically illustrated in Fig. 22 wherein the fingers 308 have been turned through 90° for convenience of illustration. When this particular unit 100 reaches the angular position 2 the bracket 134 commences movement with the unit 100. At this time the fingers 308 and suction pads 354 are in the relative positions illustrated in Fig. 23. These parts remain in this relationship as they move through positions 2 and 3, as shown in Figs. 23 and 24. However, during this time the suction heads 144 and 200 move apart for the purpose of expanding the sleeve 88. To this end the operating parts of the mechanism 86 progress through the segments f—g and g—h. By the time the position h is reached the unit 100 has moved into position 4 wherein the fingers 308 have been moved downwardly and expanded, as shown in Fig. 25.

Suction is then cut off from the heads 144 and 200 whereupon the fingers 308 are given control of the banding sleeve 88. The opening and transferring mechanism 86 in the meantime has started into the segment h—a wherein the bracket 134 is swung in a clockwise direction to return to its initial position. Such operation is indicated in the diagram in Fig. 34 and it will be observed that the general path of travel of the suction head 144 is therein indicated. When the sleeve-applying unit 100 reaches position 5 the fingers 308 will have been fully expanded, as illustrated in Fig. 26. This relationship continues through position 6 as shown in Fig. 27, but as the parts move from position 6 toward position 7 the fingers 308 and sleeve 88 carried thereby move vertically upwardly relative to the suction pads 354. By the time the position 7 is reached the suction pads 354 are positioned opposite diametrically opposed outer face portions of the walls 90 and 91 of sleeve 88, as shown in Fig. 28. As the parts move from position 7 toward position 8 the suction pads 354 move toward one another to bring the perforated face plates thereof into engagement with opposite face portions of the sleeve 88. When such engagement has occurred the valve mechanism, including the sliding valve plate 330, will be so actuated as to apply suction to the pads 354. This occurs when the parts are substantially in position 8, as shown in Fig. 29.

The suction pads 354 are then moved vertically downwardly relative to the fingers 308 whereby to carry the sleeve 88 downwardly onto the neck of a container 56 which in the meantime has been brought into vertical alignment with the unit 100. During this operation the parts move through position 9 illustrated in Fig. 30.

From position 9 to position 10 the suction pads 354 move on downwardly to whatever extent may be appropriate for the particular container 56. An example of an appropriate final position is illustrated in Fig. 31. When this position has been reached suction is cut off from the suction pads 354 and as the parts move from position 10 to position 11 the suction pads 354 may be moved away from each other, leaving the sleeve 88 in proper position upon the container 56. As the parts move from position 11 to position 12 the suction pads 354 move vertically upwardly to clear the container 56. The parts then move from position 12 into position 1 whereupon the operation is repeated.

Inasmuch as there are two units 100 in the embodiment chosen for illustration herein it will be appreciated that these units will go through the operations just described 180° apart. Furthermore, the opening and transferring mechanism 86 operates twice during each complete revolution of the turret 98 whereby to furnish a banding sleeve 88 to each of the alternately presented units 100.

From a further inspection of Fig. 34 it may be observed that the containers 56 are brought in from the left hand side of the diagram along the path 409 and in the direction indicated by the arrows. At the intersection of the path 409 with the circumferential path 410 of the applying units 100 the containers enter an arcuate path 412 in horizontal coincidence with a portion of the path 410. Thus a container 56 moves into a position in vertical alignment with a unit 100 when such unit is moving between position 8 and position 9. This condition persists through position 12 and thereafter the container 56 enters a straight path 414.

Fig. 34 has been supplied with appropriate legends and is so designed as to coordinate the positions a—j of the opening and transferring mechanism 86 with the positions 1—12 of a sleeve-applying unit. Fig. 2 shows developments of barrel cam grooves properly designed to operate the units 100 in the manner described.

From the above detailed description of the mechanism and of the operation of such mechanism it is apparent that the present invention achieves the objects stated above. Such description is presented in an illustrative rather than a limiting sense, and it is the intention to cover such modifications and variations thereof as may fall within the proper scope of the appended claims.

We claim:

1. In a machine for applying banding sleeves to containers, the combination of means for moving a line of containers continuously through a predetermined path; a continuously operable rotary turret; means within said turret for applying a banding sleeve to each container moving through said predetermined path; a magazine for holding a bulk supply of banding sleeves in flattened form; and a cyclically operable transfer device comprising means for individually removing banding sleeves from said magazine, opening said sleeves and moving said sleeves into position for transfer to the sleeve-applying means within said turret and synchronously therewith.

2. In a machine for applying banding sleeves to containers, the combination of means for moving a line of containers continuously through a predetermined path; a constantly rotating turret; a plurality of similar units within said turret, each of said units being adapted to apply a banding sleeve to a container moving through said predetermined path; a magazine for holding a bulk supply of banding sleeves in flattened form; a cyclically operable transfer device including means for individually removing banding sleeves from said magazine, opening said sleeves and moving said sleeves into position for transfer successively to the sleeve-applying units within said turret; and means operative during each complete revolution of said turret for operating said transfer device through a number of complete cycles equal to the number of sleeve-applying units within said turret.

3. In a machine for applying banding sleeves to containers, the combination of means for moving a line of containers continuously through a predetermined path; a constantly rotating turret; a plurality of similar units within said turret, each of said units being adapted to apply a banding sleeve to a container moving through said predetermined path; a magazine for holding a bulk supply of banding sleeves in flattened form; a cyclically operable transfer device including means for individually removing banding sleeves from said magazine, opening said sleeves and moving said sleeves into position for transfer successively to the sleeve-applying units within said turret; and means operative during each complete revolution of said turret for operating said transfer device through a number of complete cycles equal to the number of sleeve-applying units within said turret, said last-named means including a cam and means for rotating said cam at an angular velocity having a ratio to the angular velocity of said turret directly proportional to the number of sleeve-applying units within said turret.

4. In a machine for applying banding sleeves to containers, the combination of means for moving a line of containers continuously through a predetermined path; a rotary turret; means within said turret for applying a banding sleeve to each container moving through said predetermined path; a magazine for holding a bulk supply of banding sleeves in flattened form; cyclically operable means for individually removing flattened banding sleeves from said bulk supply, opening said flattened banding sleeves into approximately cylindrical form and moving said opened sleeves synchronously with said turret within a predetermined path of travel; and means associated with said turret for effecting transfer of said banding sleeves from said predetermined path of travel to the sleeve-applying means within said turret.

5. In a machine for applying banding sleeves to containers, the combination of means for moving a line of containers continuously through a predetermined path; a rotary turret; means within said turret for applying a banding sleeve to each container moving through said predetermined path, said last named means including expansible and contractible fingers; a magazine for holding a bulk supply of banding sleeves in flattened form; cyclically operable means for individually removing flattened banding sleeves from said bulk supply, opening said flattened banding sleeves into approximately cylindrical form and moving said opened sleeves synchronously with said turret within a predetermined path of travel; means associated with said turret for contracting said fingers, inserting said contracted fingers into an opened banding sleeve moving within said predetermined path of travel and expanding said fingers to secure said opened banding sleeve thereto for travel with said turret into a position for application to a container and separate means carried by said turret and associated with said fingers for thereafter removing said opened banding sleeve from said fingers and transferring said opened banding sleeve to a container.

6. In a machine for applying banding sleeves of the type described to containers, the combination of means for supporting a container, expansible means for holding a banding sleeve in opened condition, suction means engageable with opposed exterior surfaces of said opened banding sleeve, means for disengaging said expansible means from said opened banding sleeve while said sleeve is engaged by said suction means, and means thereafter effective for causing relative movement between said suction means and said container to apply said banding sleeve to said container.

7. In a machine for applying banding sleeves of the type described to containers, the combination of means for supporting a container, expansible and contractible fingers engageable with a banding sleeve, means for contracting said fingers, means for inserting said contracted fingers into a banding sleeve, means for expanding said fingers to hold said banding sleeve thereon in opened condition, suction means engageable with opposed exterior surfaces of said opened banding sleeve while said sleeve is engaged by said fingers, means for again contracting said fingers for disengaging said fingers from said opened banding sleeve, and means thereafter effective for causing relative movement between said suction means and said container to apply said banding sleeve to said container.

8. In a machine for applying banding sleeves to containers, means for supporting a container, means for holding a bulk supply of sleeves made of flexible material and having the inner surfaces of the opposing walls thereof flattened into face to face contact and means for successively withdrawing individual sleeves from said supply, means for causing relative sliding movement between portions of the inner surfaces of said opposed sleeve walls and substantially within the plane of face to face contact thereof whereby to force other portions of said inner surfaces to separate, means for thereafter completing the separation of said inner surfaces to completely open a banding sleeve; expansible means engageable with said opened banding sleeve for holding the same in opened condition, suction means engageable with opposed exterior surfaces of said opened banding sleeve, means for disengaging said expansible means from said opened banding sleeve while said sleeve is engaged by said suction means, and means thereafter effective for moving said suction means to apply said banding sleeve to said container.

HOWARD G. ALLEN.
WILLIAM O. SIMS.
EDWARD A. EBERT.

REFERENCES CITED

The following references are of record in the file of this patent:

UNITED STATES PATENTS

| Number | Name | Date |
|---|---|---|
| 1,835,336 | Risser | Dec. 8, 1931 |
| 2,036,105 | Strout | Mar. 31, 1936 |
| 2,089,769 | Strout | Aug. 10, 1937 |
| 2,103,302 | Strout | Dec. 28, 1937 |